(No Model.) 2 Sheets—Sheet 1.
W. N. HARTSHORN.
BALL AND SOCKET JOINT FOR USE IN MILLS.
No. 527,282. Patented Oct. 9, 1894.
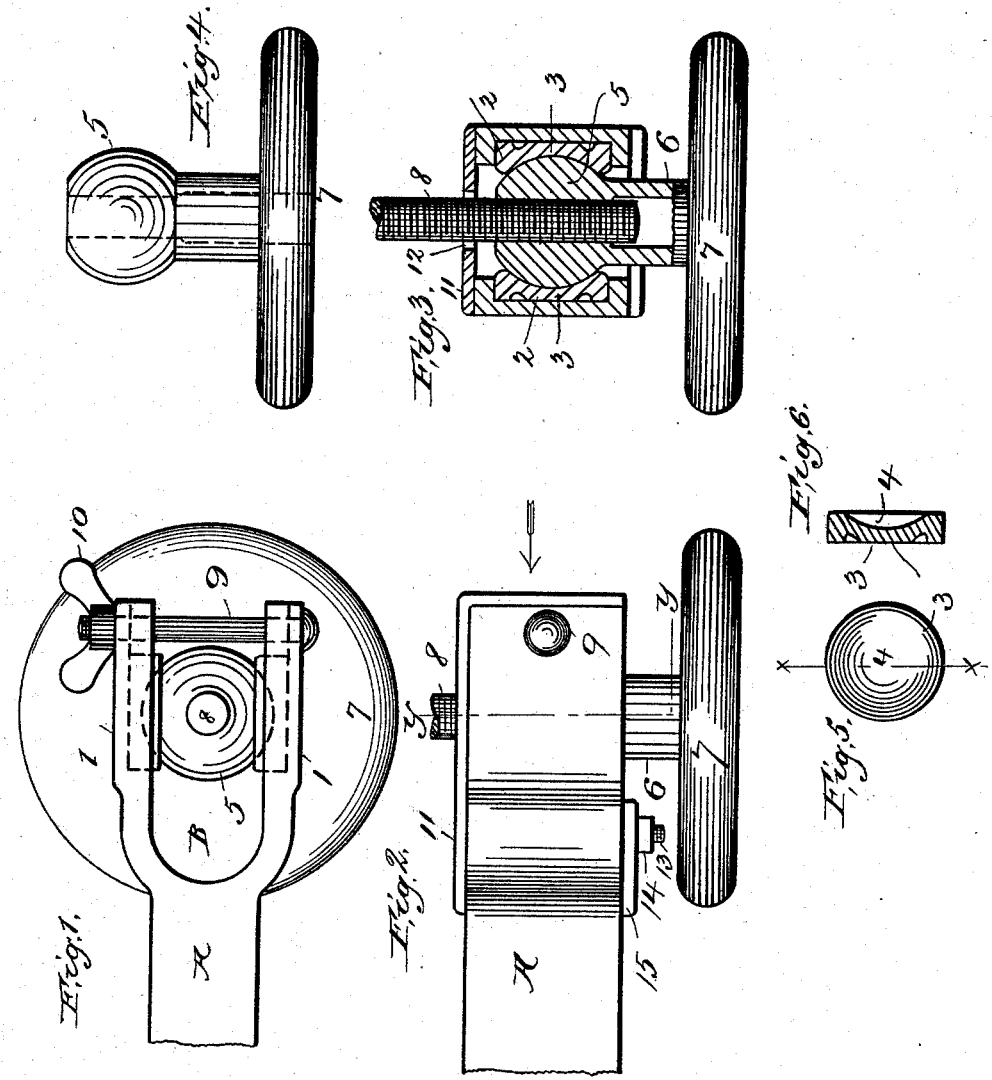
WITNESSES:
INVENTOR
ATTORNEY.

(No Model.) 2 Sheets—Sheet 2.
W. N. HARTSHORN.
BALL AND SOCKET JOINT FOR USE IN MILLS.
No. 527,282. Patented Oct. 9, 1894.
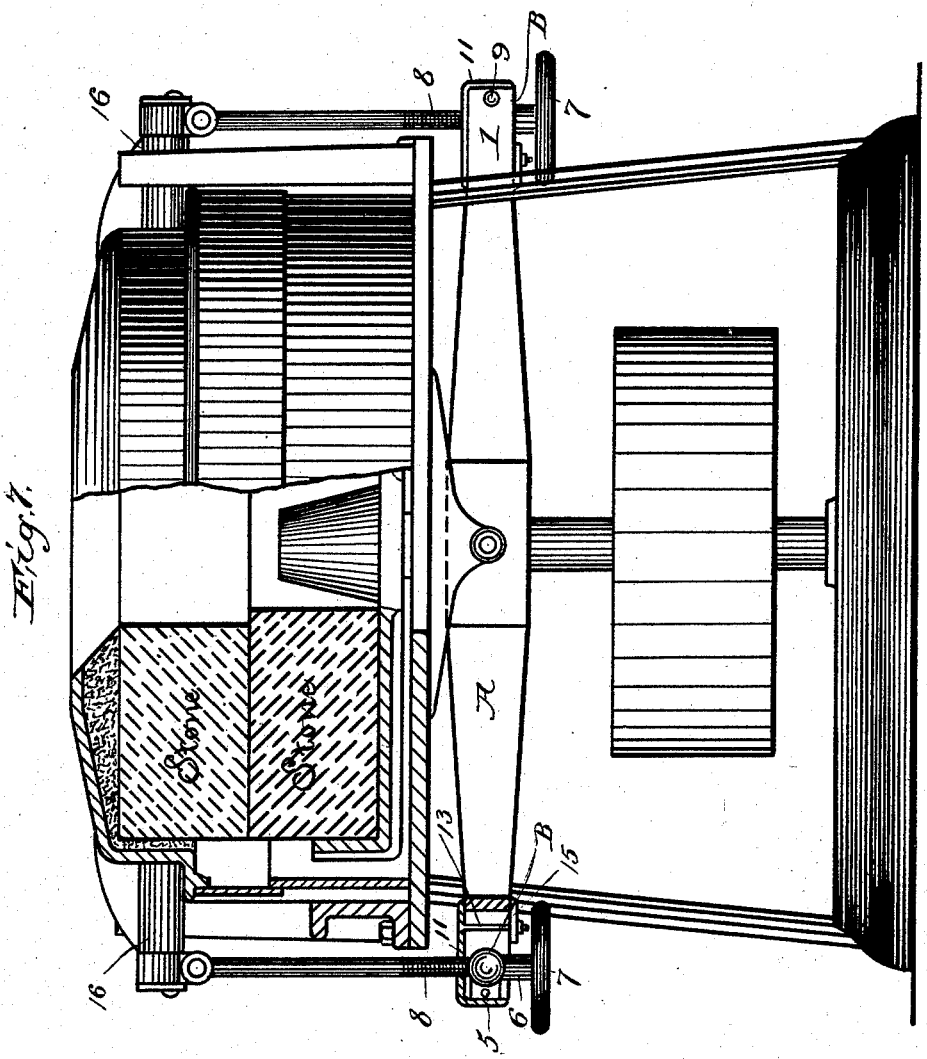
WITNESSES:
Rufus Batchelder
Chas. Francis Bates
INVENTOR
Willis N. Hartshorn
BY Clarence Ladd-Davis
ATTORNEY.

UNITED STATES PATENT OFFICE.

WILLIS N. HARTSHORN, OF BROOKLYN, ASSIGNOR TO SAMUEL CAREY, OF NEW YORK, N. Y.

BALL-AND-SOCKET JOINT FOR USE IN MILLS.

SPECIFICATION forming part of Letters Patent No. 527,282, dated October 9, 1894.

Application filed June 4, 1894. Serial No. 513,375. (No model.)

*To all whom it may concern:*

Be it known that I, WILLIS N. HARTSHORN, a citizen of the United States, residing at the city of Brooklyn, in the county of Kings and State of New York, have invented certain new and useful Improvements in Ball-and-Socket Joints for Use in Mills and for other Purposes, of which the following is a specification, such as will enable others skilled in the art to which it appertains to make and use the same.

The objects of my invention are, first, to provide a ball and socket joint of such form that the ball may be easily adjusted upon and moved along the shaft or spindle thereof, and second to provide means for clamping the ball in its socket in any desired position, so as to prevent movement thereof, and while not limited to such use, the same is designed more particularly for use in grinding-mills of the particular form known as balanced stone mills, and the particular form of joint herein shown, is that particular form of my said invention, more particularly designed and adapted to be used in such mills; and to the ends above mentioned, my said invention consists of the construction, combination and arrangement of parts, shown and described in the following specification, of which the accompanying drawings form a part, wherein similar letters or numerals of reference designate like or equivalent parts wherever found throughout the several views, and in which—

Figure 1, is a top plan view of the particular form of my improved ball and socket joint used in mills, the screw-spindle and cover being removed, and Fig. 2, is a side view of the construction shown in Fig. 1, the screw-spindle and cover being in position. Fig. 3 is a front view, looking in the direction of the arrow, of Fig. 2, in section on the line *y—y* thereof. Fig. 4, is a detail side view of my improved form of ball provided with a hand-wheel for rotating the same, used in such joint. Fig. 5 is a detail front or face view of one of the removable socket-gibs forming part of such joint; and Fig. 6 is a side view of such gib, in central section thereof on the line *x—x* of Fig. 5, while Fig. 7 is a front view in elevation and partial section of a grinding-mill of the balanced stone variety, showing the manner of the application of my improved form of ball and socket joint thereto.

As shown in said drawings, the casing of my improved form of ball and socket joint, as applied to balanced stone mills, is formed integral with and forms a part of the end of the centrally pivoted stone balancing lever A of the mill, which lever is for that purpose provided at each end with a bifurcation or open ended fork B, consisting of two arms or side-pieces 1, of any desired shape, preferably that shown, such side-pieces 1 being like the lever A preferably of steel or iron of great natural resiliency, and cut or otherwise formed in the inner side of each of such side-pieces 1, and extending from the extreme open end of the bifurcation or fork nearly to the extreme rear thereof, is a suitable slot 2, preferably of substantially the shape shown, adapted to receive in each case a removable socket-gib 3, which gibs are preferably of cast steel, and of the shape shown in Figs. 5 and 6, but such gibs are in any event provided on one side with the central hollow cup or depression 4 of the same shape as the exterior of the ball 5, which ball is preferably provided with a shank 6, to which is attached a hand-wheel 7, such ball, shank and hand-wheel being preferably cast or otherwise formed in one piece, or such ball may be provided with any other suitable means of rotating the same; and such ball is also provided with a central hole which extends preferably entirely through such ball shank and hand-wheel as shown, and is provided with an interior screw-thread, so as to receive and hold therein the screw threaded rod, spindle or shaft 8. Passing through holes formed for that purpose in the extreme outer ends of the side-pieces 1 of the fork B, and extending across the open end of such fork so as to close such open end at about the center thereof, is a suitable bolt 9, provided with a suitable screw-thread at one end adapted to receive a suitable screw-nut 10, preferably a thumb-nut as shown, and such bolt 9 serves the double purpose of forcing the side-pieces 1 toward one another so as to clamp the ball 5 against movement, and of closing the open end of the fork so as to prevent the socket-gibs 3 as well as the ball 5 from getting out of position when once inserted in place in the fork B.

The open top and the open front end of the fork B, is preferably provided with a suitable cover 11, provided with a hole 12, adapted to receive the rod or spindle 8, which hole is of course of sufficient size to allow of free movement of such rod during oscillation of the ball 5, and such cover 11 is held in place on such fork B, in any desired manner, preferably by a suitable screw-bolt 13 and nut 14, which bolt passes down through such cover and through a plate 15 which covers the rear portion of such fork, as shown in Figs. 2 and 7.

When attached to grinding-mills of the balanced stone variety, as shown in Fig. 7, my improved form of ball and socket joint is found to be of great advantage in the operation of such mills, as otherwise there is usually great trouble experienced whenever the stones are replaced after dressing in connecting the upper ends of the rods 8 with the pivot-shafts 16 of the still or non-revolving upper stone of such mill, but when my improved form of joint is used to connect the lower ends of such rods to the ends of the pivoted stone balancing lever A, such connection is effected in an instant of time, simply by loosening the thumb-nut 10 of the bolt 9, after which the oscillation of the ball 5 will allow of the rod 8 being brought to any position required to connect the same with the pivot-shaft 16 on that side, and after this is done by turning upon the handwheel 7, such upper stone will be pulled down tightly upon the lower stone, when by turning the thumb-nut 10 so as to compress the open end of the fork B the socket-gibs 3 will compress the ball 5 between them, thereby locking such ball against any movement whatever, when the mill will be ready for operation.

The manner of assembling the various parts of my improved ball and socket-joint, and of operating the same, is as follows: The parts being asunder, the two socket-gibs 3 are placed one on each side of the ball 5, in the position shown, with such ball resting in the hollows 4 thereof, and while in such position such gibs and the ball are slid into the open end of the fork B, such gibs 3 being of such size as to slide easily along in the slots 2, formed for that purpose in the side-pieces 1 of such fork. The bolt 9 is then passed through the hole in the outer ends of such pieces 1, so as to close the open end of such fork, and hold such gibs and ball in place therein, and the thumb-nut 10 is then screwed lightly down against the side-piece on that side of the fork, after which the cover 11 may be secured in place upon such fork by means of the bolt 13, nut 14 and plate 15, and then the screw-threaded lower end of the rod or spindle 8 may be passed through the hole 12 in the cover 11, and screwed into the ball 5 by rotation of the same by manipulation of the hand-wheel 7 thereof, and when such ball has been screwed far enough upon such rod the thumb-nut 10 is screwed down as tightly as possible so as to press the two sides of the fork together sufficiently far to clamp such ball tightly between the two socket-gibs 3, whereby such ball will be locked against oscillation or movement, and when thereafter any change in the position of the ball or movement of the same along the spindle or rod 8 is desired it will only be necessary to loosen the thumb-nut 10 when such change may be instantly and easily made, for the reason that the natural resiliency of the side-pieces 1 of the fork B will at once and as soon as the same are released from pressure throw the same apart sufficiently far to allow of such free movement or rotation of such ball 5.

As hereinbefore stated, I do not intend to limit myself to the use of this joint with grinding-mills, or any other particular form of mechanism, nor to the exact form of construction of joint shown and described herein, as it is evident that a joint substantially similar in form may be used for many purposes, and that many changes in the construction, combination and arrangement of the various parts thereof, may be made without departing from the scope of my invention, and therefore, Having now particularly described and ascertained the nature of my said invention, its construction and operation, what I claim, and desire to secure by Letters Patent, is—

1. In a ball-and-socket joint, the combination with a ball provided with a screw-threaded hole, of a screw-threaded rod or spindle, means secured to or formed integral with the ball for rotating the same, and a socket for the ball, substantially as shown and described.

2. In a ball-and-socket joint, the combination with a ball provided with a screw-threaded hole, of a screw-threaded rod or spindle adapted to screw into the same, a hand-wheel secured to or formed integral with the ball, and a socket for the ball, substantially as shown and described.

3. In a ball-and-socket joint, the combination with a ball provided with a screw-threaded hole, of a screw-threaded rod or spindle adapted to screw into the same, a hand-wheel secured to or formed integral with the ball, a bifurcated casing for the ball, and means for forcing the sides of such bifurcation inward toward one another, substantially as shown and described.

4. In a ball-and-socket joint, the combination with a ball provided with a screw-threaded hole, of a screw-threaded rod or spindle adapted to screw into the same, a hand-wheel secured to or formed integral with the ball, two socket-gibs located one on each side of the ball, a bifurcated casing holding the gibs in place against the ball, and means for forcing the sides of the bifurcated casing inward toward one another so as to compress the ball between the gibs, substantially as shown and described.

5. In a mill of the class described, the combination with a stone-balancing-lever A, of a ball-and-socket at either end of such lever, two pivot-shafts 16 secured to one of the stones of the mill, and mechanism connecting the ball of one of the sockets with one of the pivots 16, and like mechanism connecting the other ball with the other pivot, substantially as shown and described.

6. In a mill of the class described, the combination with the pivot-shafts 16 secured to one of the stones of the mill, of rods or spindles 8 secured at one end to such pivot-shafts and provided at the other ends with screw-threads, a ball screwed upon each of such spindles and provided with means for rotating the same, a pivoted stone-balancing-lever A, and sockets for such balls located in the lever A, substantially as shown and described.

7. In a mill of the class described, the combination with the pivot-shafts 16 secured to one of the stones of the mill, of rods or spindles secured at one end to such pivot-shafts and provided at the other end with screw-threads, a ball screwed upon each of such spindles and provided with a hand-wheel for rotating the same, a stone-balancing lever A, and sockets for the balls connecting the same with the lever A, substantially as shown and described.

8. In a mill of the class described, the combination with the pivot-shaft 16 secured to one of the stones of the mill, of rods or spindles 8 secured at the upper ends to such pivot-shafts and provided at the lower ends with screw-threads, a ball screwed upon each of such spindles and provided with means for rotating the same, two socket-gibs for each of the balls, a stone-balancing-lever A, having a bifurcation at each end thereof forming a casing for one of the balls and its gibs, and means for forcing the sides of the bifurcations inward toward one another so as to compress the balls between the gibs and lock the same against movement, substantially as shown and described.

9. In a mill of the class described, the combination with two pivot-shafts 16 secured to one of the stones of the mill, of a pivoted stone-balancing-lever A having a bifurcation or fork B at either end, a ball located in a suitable socket in each of such bifurcations B, means for forcing the sides of such bifurcations inward toward one another so as to lock the balls against movement in their sockets, and mechanism connecting each of such balls with one of the pivot-shafts 16, substantially as shown and described.

Signed at the city and county of New York, in the State of New York, this 17th day of May, A. D. 1894.

WILLIS N. HARTSHORN.

Witnesses:
H. G. HARRIS,
FRANK SIMON.